UNITED STATES PATENT OFFICE.

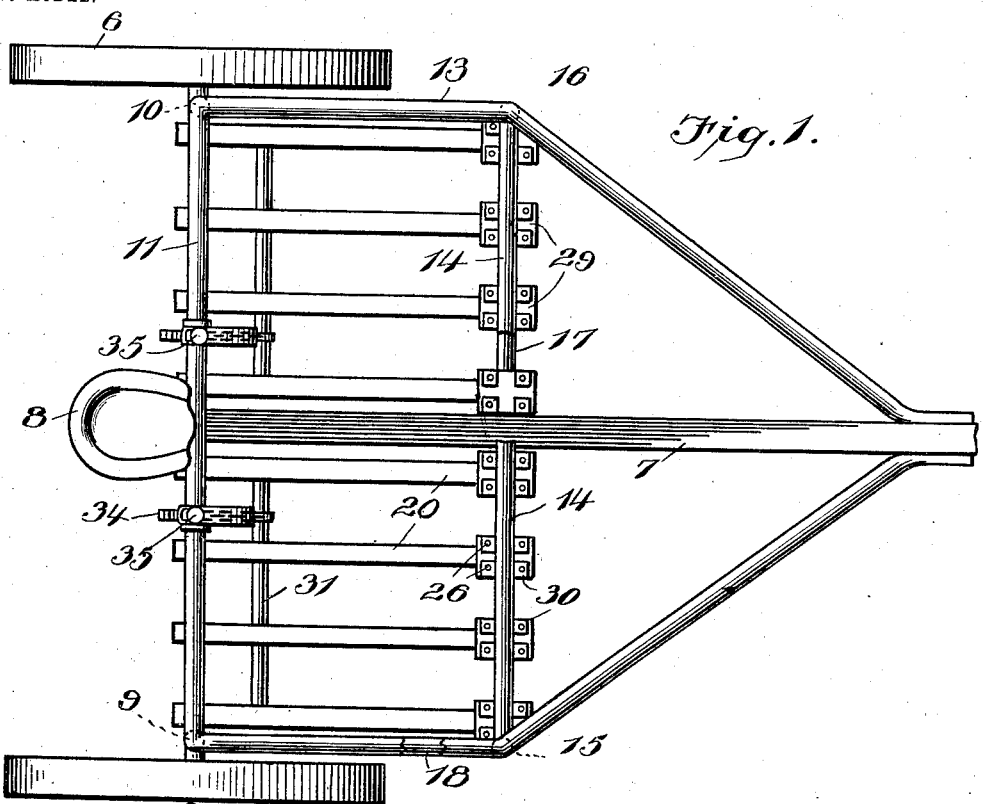

JOSEPH B. STREHL, OF OWOSSO, MICHIGAN.

BEET-WEEDER.

SPECIFICATION forming part of Letters Patent No. 725,296, dated April 14, 1903.

Application filed March 20, 1902. Serial No. 99,201. (No model.)

*To all whom it may concern:*

Be it known that I, JOSEPH B. STREHL, a citizen of the United States, residing at Owosso, in the county of Shiawassee, State of Michigan, have invented certain new and useful Improvements in Beet-Weeders; and I do hereby declare the following to be a full, clear, and exact description of the invention, such as will enable others skilled in the art to which it appertains to make and use the same.

This invention relates to beet-weeders; and it has for its object to provide a weeder which may be operated to effectively weed the beets and which will have such a specific structure as to permit its manufacture at a low cost.

A further object of the invention is to provide a construction in which the weeding-hoes are connected in gangs and are provided with means for raising the gangs individually from operative positions.

Other objects and advantages of the invention will be understood from the following description.

In the drawings forming a portion of this specification, and in which like numerals of reference indicate similar parts in the several views, Figure 1 is a top plan view of the implement. Fig. 2 is a vertical section taken transversely of the axle of the implement and showing the arrangement of the means for lifting one gang of hoes. Fig. 3 is a detail perspective view of one of the clips employed in the construction shown in Figs. 1 and 2.

Referring now to the drawings, there is shown a beet-weeder comprising an axle 5, on which are mounted the wheels 6, and to which axle is connected the tongue 7, which extends over the axle and rearwardly thereof and upon the rear portion of which is secured the seat 8. Upon the axle is secured the rear end of a frame, including uprights 9 and 10, connected at their upper ends by the cross-piece 11, the uprights having bearings at their lower ends which receive the axle. From the upper ends of the uprights extend forwardly the bars 12 and 13, connected at their forward ends by the bar 14, to which in turn are connected the uprights 15 and 16, said bars 12 and 13 extending forwardly of the last-named uprights and being connected to the tongue 7. Connecting the lower ends of the uprights 15 and 16 is the cross-bar 17, while bars 18 and 19 connect the lower ends of the uprights 15 and 16 with the lower ends of the uprights 9 and 10, respectively. To the cross-bar 17 are connected the ends of spring-arms 20. To secure the arms 20 to the bar, so as to permit the hoes 21 at the lower end thereof to be raised and lowered, clips 22 are provided, said clips being disposed with their bights 23 against the under side of the bar and with their arms 24 and 25 extending upwardly at the front and rear of the bar. Each of the arms 24 and 25 is bifurcated to form spaced fingers 26, and said fingers are provided with shoulders 27, against which rests the plate 28, having perforations through which the fingers are engaged. The plate 28 rests lightly against the upper face of the bar. The forward end of an arm 20 is disposed upon each of the plates 28 and between the fingers 26 of each arm of the clip, and to hold the arm 20 in this position a clamping-plate 29 is disposed upon the arm 20 and has also perforations through which the fingers 26 are received, the plate 29 being held by the nuts 30 in position to clamp the arm 20 against the plate 28. In this way the arms 20 are securely held pivotally connected to the axle.

To connect the hoes in gangs, a bar 31 is engaged through eyes 32 on the under faces of the arms 20 of each gang of hoes. To raise each gang of hoes, a lever 35 is provided and is pivoted upon the bar 11, said lever being connected by a chain 33 with the corresponding bar 31, so that when a lever is rocked in one direction the bar, and therewith the connected hoes, will be raised, and when the lever is rocked in the opposite direction they will be lowered. To hold the levers at different points of their pivotal movement, notched segments 34 are provided in coöperative relation to bolts or pawls 36, mounted on the levers. By this means the hoes may be held in position above the ground or may be lowered to cut into the ground to the desired depth.

To permit of adapting the present implement to cultivating beets, the spring-arms 20

(shown in Figs. 1 and 2 of the drawings) are provided, having tools 21 attached thereto by means of bolts 60, which permit of ready removal of the tools from the spring arms or plates.

It will also be understood that in practice additional spring-arms may be employed to carry additional cultivator-hoes when desired and that other modifications may be made and any suitable proportions used without departing from the spirit of the invention.

What is claimed is—

1. A beet-weeder comprising an axle having supporting-wheels, a tongue connected to the axle, a frame extending above and projecting forwardly from the axle, spring-arms pivotally connected with the frame in advance of the axle and having hoes at their lower ends, and levers mounted upon the frame and connected with the hoes for manipulating them.

2. A beet-weeder comprising an axle having supporting-wheels, a frame connected to the axle and extending above and forwardly from the axle, spring-arms pivotally connected to the frame in advance of the axle and having hoes at their lower ends, bars connected each with a group of arms, levers mounted upon the frame and connections between each lever and a bar for raising and lowering the hoes.

In testimony whereof I affix my signature in presence of two witnesses.

JOSEPH B. STREHL.

Witnesses:
W. E. PAYNE,
GEO. M. GRAHAM.